United States Patent
Hilakos et al.

(10) Patent No.: US 11,667,528 B2
(45) Date of Patent: Jun. 6, 2023

(54) METHOD FOR REMOVING CADMIUM IN THE MANUFACTURE OF PHOSPHORIC ACID

(71) Applicant: JESA TECHNOLOGIES LLC, Lakeland, FL (US)

(72) Inventors: Stephen Wayne Hilakos, Lakeland, FL (US); Anis Lakhouaja, Lakeland, FL (US)

(73) Assignee: JESA TECHNOLOGIES LLC, Lakeland, FL (US)

( * ) Notice: Subject to any disclaimer, the term of this patent is extended or adjusted under 35 U.S.C. 154(b) by 0 days.

(21) Appl. No.: 17/636,708

(22) PCT Filed: Aug. 20, 2020

(86) PCT No.: PCT/US2020/047216
§ 371 (c)(1),
(2) Date: Feb. 18, 2022

(87) PCT Pub. No.: WO2021/035058
PCT Pub. Date: Feb. 25, 2021

(65) Prior Publication Data
US 2022/0332582 A1   Oct. 20, 2022

Related U.S. Application Data

(60) Provisional application No. 62/889,971, filed on Aug. 21, 2019.

(51) Int. Cl.
*C01B 25/223* (2006.01)
*C01B 25/238* (2006.01)
(Continued)

(52) U.S. Cl.
CPC .......... *C01B 25/223* (2013.01); *C01B 25/238* (2013.01); *C02F 1/28* (2013.01);
(Continued)

(58) Field of Classification Search
None
See application file for complete search history.

(56) References Cited

U.S. PATENT DOCUMENTS

| 4,634,580 A | 1/1987 | Jdid et al. |
| 2004/0179984 A1 | 9/2004 | Nagaraj et al. |
| 2019/0106324 A1* | 4/2019 | Zhang .................. C01B 25/238 |

FOREIGN PATENT DOCUMENTS

| WO | 89/03805 A2 | 5/1989 |
| WO | 2016/069263 A1 | 5/2016 |

(Continued)

OTHER PUBLICATIONS

International Search Report and Written Opinion, dated Nov. 19, 2020, for International Patent Application No. PCT/US2020/047216. (8 pages).

*Primary Examiner* — Clare M Perrin
(74) *Attorney, Agent, or Firm* — Seed IP Law Group LLP

(57) ABSTRACT

Methods for removing cadmium (Cd) from a phosphoric acid solution produced in a wet process for manufacturing phosphoric acid, comprising treating the wet-process phosphoric acid solution with a small amount of a solid adsorbing material and a complex reagent to form a cadmium complex-contaminated solid adsorbing material, and removing the contaminated solid adsorbing material to yield a treated phosphoric acid solution having a low Cd content.

19 Claims, 4 Drawing Sheets

(51) Int. Cl.
*C02F 1/28* (2023.01)
*C02F 1/68* (2023.01)
C02F 101/20 (2006.01)
C22B 3/42 (2006.01)

(52) U.S. Cl.
CPC .......... *C02F 1/683* (2013.01); *C01P 2006/80* (2013.01); *C02F 2101/20* (2013.01); *C22B 3/42* (2013.01)

(56) References Cited

FOREIGN PATENT DOCUMENTS

WO 2019/063765 A1 4/2019
WO 2019/071108 A2 4/2019

\* cited by examiner

METHOD FOR REMOVING CADMIUM IN THE MANUFACTURE OF PHOSPHORIC ACID

BACKGROUND

Technical Field

This invention relates to methods for manufacturing phosphoric acid from a calcium- and cadmium-containing phosphate ore and, more particularly, to methods of removing cadmium from the phosphoric acid.

Description of the Related Art

Phosphate rock (phosphorite) is a marine sedimentary ore that contains about 18-40% (w/w) phosphorus pentoxide ($P_2O_5$). One well-known method of producing phosphoric acid ($H_3PO_4$)—commonly referred to as "wet process"—is to treat phosphate rock with sulfuric acid at high temperatures in a reactor. During this process, the phosphate rock is dried, crushed, and then continuously fed into the reactor along with sulfuric acid. In addition to the resulting slurry of crude phosphoric acid, calcium ions within the phosphate rock combine with sulfate and form calcium sulfate solids (gypsum, $CaSO_4$), which are then separated from the resulting solution by filtration. The resulting phosphoric acid is then clarified and concentrated to give commercial grade acid for a variety of industrial applications or converted into fertilizers. However, during the production of wet-process phosphoric acid, heavy metal impurities present as minerals in the phosphate rock (such as cadmium, arsenic, copper, lead and mercury) are dissolved and remain in the resulting phosphoric acid solution. These heavy metal impurities are considered toxic and must be either completely removed, or their levels reduced significantly, depending on the application of the phosphoric acid.

Numerous techniques have been considered and reported on in the art for removing heavy metal impurities from phosphoric acid, including precipitation, extraction, adsorption, co-crystallization and electrolysis techniques. For example, U.S. Pat. No. 4,511,541 discloses a method for selectively recovering (extracting) cadmium, molybdenum, zinc, nickel and other metal ions from phosphoric acid solutions. More specifically, it is taught that an aqueous solution of phosphoric acid can be treated with an organophosphine extractant in a water-immiscible organic solvent (such as kerosene) to precipitate the metal ions for subsequent separation by way of extraction. One problem with this method is that the metal ions form complexes in the aqueous phase (i.e., the phosphoric acid solution), thereby making removal difficult. Further, the solvent extraction step to remove the precipitated metal impurities renders the process very time-consuming and expensive, and only applicable in treating filtered or pre-purified phosphoric acid solutions.

European Patent No. 0 333 489 B1 describes a method of simultaneously using a thio-organophosphine reagent, a reducing agent and an adsorbent (either inherently present in or added to the phosphoric acid solution) to remove cadmium and copper from the phosphoric acid solution. Due to treatment with the reducing agent, small amounts of the thio-organophosphine reagents are required (compared to when the reduction step is not carried out).

PCT Patent Application Pub. No. WO 2004/083118 describes a precipitation technique to remove heavy metal impurities (such as cadmium, copper, lead, nickel, arsenic, manganese and mercury) by treating crude phosphoric acid (i.e., prior to calcium sulfate filtration) with water-soluble metal-precipitating compositions. The compositions can remain liquid in the phosphoric acid phase, thereby permitting dispersion in the acidic solution and enhancing capture of metal impurities therein. Further, the precipitates formed can be filtered in the absence of calcium sulfate, and no additional reagents (such as a reducing agent or absorbent agent) are required for metal removal. The applicant of WO 2004/083118, Cytec Technology Corp. (now owned by Solvay SA), has commercialized a series of heavy metal removal reagents. For example, Cytec/Solvay's ACCO-PHOS® 800 reagent is disclosed for application to the slurry of phosphoric acid before the filtration step of removing the generated calcium sulfate (and after the concentration step). The dosage of the reagent may be around 3 kg/ton of $P_2O_5$, where the dosage required is high because the solid concentration (mainly calcium sulfate) is high (about 30 to 35% (w/w)) when the reagent stream is introduced into the phosphoric acid solution. The cadmium ions in the acid solution form complexes with the reagents prior to calcium sulfate being removed in a subsequent filtration step. This process, however, results in the generation of large amounts of calcium sulfate contaminated with heavy metals such as cadmium, which is considered a hazardous waste. Further, this process is performed under high temperatures which, combined with the high reagent concentration, leads to decomposition of reagent.

Accordingly, there is a need in the art for improved techniques for removal of heavy metal impurities, such as cadmium or arsenic, from a wet-process phosphoric acid solution. The present invention fulfils this need and provides other advantages as evident from the following description.

BRIEF SUMMARY

In brief, methods are provided for removing cadmium (Cd) from a phosphoric acid solution produced in a wet process for manufacturing phosphoric acid. The methods comprise treating the wet-process phosphoric acid solution with a small amount of a solid adsorbing material and a complex reagent to form a cadmium complex-contaminated solid adsorbing material, and then removing the contaminated solid adsorbing material to yield a treated phosphoric acid solution having a low Cd content.

In some embodiments, the invention provides a method for manufacturing phosphoric acid from a calcium- and cadmium-containing phosphate ore, comprising the steps of: (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated cadmium content more than about 10 mg Cd/kg $P_2O_5$; (c) treating the wet-process phosphoric acid solution with from about 0.5 to about 10% (w/w) of a solid adsorbing material and from about 150 to about 900 ppm (by weight on a 100% basis) of a complex reagent to form a cadmium complex-contaminated solid adsorbing material; and (d) removing the cadmium complex-contaminated solid adsorbing material from the phosphoric acid solution to yield a treated phosphoric acid solution having a post-treated cadmium content at least about 10% lower than the pre-treated cadmium content.

In certain embodiments, the solid adsorbing material used in the method of the invention is calcium sulfate, aluminosilicates, activated carbon, plastic resins, diatomaceous earth or perlite. In further embodiments, the solid adsorbing material is calcium sulfate. In more specific embodiments, in the step (c) of the method of the invention, the wet-process phosphoric acid solution is treated with from about 0.5 to about 5% (w/w), from about 0.5 to about 2.5% (w/w), from about 0.5 to about 1% (w/w), or from about 0.5 to about 0.75% (w/w), of the solid adsorbing material.

In some embodiments, the complex reagent used in the method of the invention has the following structure of formula (I):

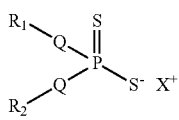

wherein
Q is a bond or O;
$R_1$ and $R_2$ are independently H, or a linear or branched $C_{1-4}$alkyl, wherein at least one of $R_1$ and $R_2$ is not H; and
X is H, an alkali metal or ammonium.

In other embodiments, the complex reagent used in the method of the invention has the following structure of formula (II):

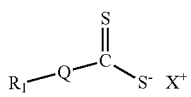

wherein
Q is a bond or O;
$R_1$ is a linear or branched $C_{1-4}$ alkyl; and
X is H, an alkali metal or ammonium.

In more specific embodiments, in the step (c) of the method of the invention, the wet-process phosphoric acid solution is treated with from about 150 to about 750 ppm, from about 150 to about 500 ppm, or from about 150 to about 250 ppm, from about 175 to about 300 ppm, from about 200 to about 300 ppm, from about 250 to about 500 ppm, or from about 300 to about 500 ppm, of the complex reagent.

The invention thus provides a relatively simple and effective way to minimize the cadmium-contaminated waste products (i.e., the resulting waste cakes). In a related manner, a similar approach may be considered for removing other heavy metals present in the phosphate ore, such as arsenic (As).

DETAILED DESCRIPTION

Figure 1A:
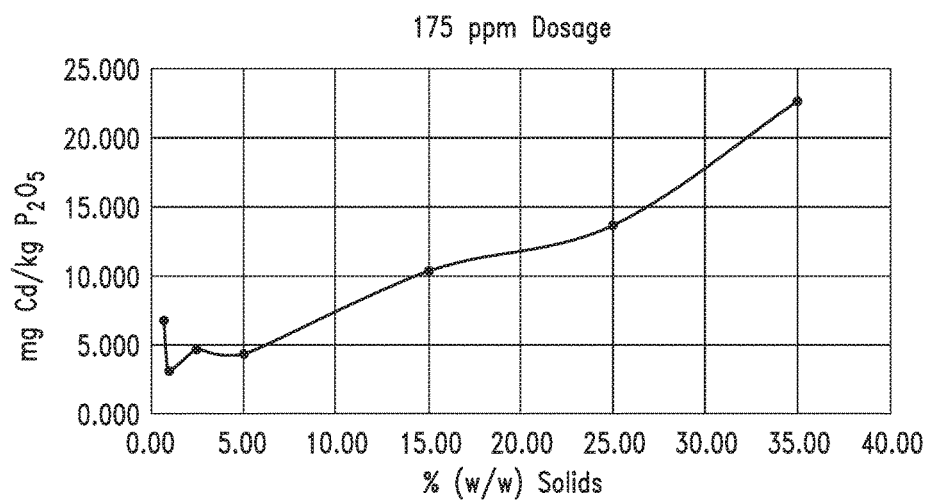
FIGS. 1A and 1B show, respectively, plots of the weight of Cadmium (Cd) removed (mg Cd/kg $P_2O_5$) versus various amounts of a solid adsorbing material added (% (w/w)) in an exemplary experiment of the present invention.

Unless the context requires otherwise, throughout this specification and claims, the words "comprise," "comprising" and the like are to be construed in an open, inclusive sense; the words "a," "an," and the like are to be considered as meaning at least one and are not limited to just one; and the term "about" is to be construed as meaning plus or minus 10%. To illustrate, "about 5" means 5±0.5. Terms not specifically defined herein should be given the meanings that would be given to them by one of skill in the art in light of the disclosure and the context.

As mentioned above, the invention provides a method comprising treating a wet-process phosphoric acid solution with a small amount of a solid adsorbing material and a complex reagent to form a cadmium complex-contaminated solid adsorbing material, and then removing the contaminated solid adsorbing material to yield a treated phosphoric acid solution having a low Cd content. It has been found that when employing a lower amount of the solid adsorbing material, the Cd removal efficiency by the complex reagent can be significantly improved. Further, using the lower amount of the solid adsorbing material can lead to less hazardous waste produced in the process of manufacturing phosphoric acid, i.e., less amounts of the Cd-contaminated waste cakes.

Accordingly, in some embodiments, the invention provides a method for manufacturing phosphoric acid from a calcium- and cadmium-containing phosphate ore, comprising the steps of: (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated cadmium content more than about 10 mg Cd/kg $P_2O_5$; (c) treating the wet-process phosphoric acid solution with from about 0.5 to about 10% (w/w) of a solid adsorbing material and from about 150 to about 900 ppm (by weight on a 100% basis) of a complex reagent to form a cadmium complex-contaminated solid adsorbing material; and (d) removing the cadmium complex-contaminated solid adsorbing material from the phosphoric acid solution to yield a treated phosphoric acid solution having a post-treated cadmium content at least about 10% lower than the pre-treated cadmium content.

"Calcium- and cadmium-containing phosphate ore" refers to phosphorite contains, for example, about 65 to 87% (w/w) bone phosphate of lime (BPL), namely $Ca_3(PO_4)_2$, and more than about 10 mg Cd/kg $P_2O_5$. Cadmium contents vary considerably in rocks from different mining sites, for example, about 40 mg Cd/kg $P_2O_5$ in rocks from Florida, about 140 mg Cd/kg $P_2O_5$ in rocks from North Carolina, up to about 500 mg Cd/kg $P_2O_5$ in rocks from Western US, and about 40 to 100 mg Cd/kg $P_2O_5$ in rocks from Morocco. In the context of the invention, "cadmium-containing phosphate ore" means the phosphorite having a Cd content greater than the desirable value, which may depend on any applicable regulatory acceptable limit on Cd content in an intended final product. There are different phosphate rock quality requirements for different processes of producing phosphoric acid. In the invention described herein, the phosphate ore is the phosphorite suitable for production of phosphoric acid by way of wet process. The phosphate ore may contain one or more heavy metals other than cadmium, such as copper, lead, nickel, arsenic, manganese, or mercury.

"Wet-process phosphoric acid solution" refers to the mixture obtained after the steps of digesting the calcium- and cadmium-containing phosphate ore with sulfuric acid and then separating out the precipitated calcium sulfate. In the invention described herein, the wet-process phosphoric acid solution is a solution that contains about 20 to 45% (w/w) $P_2O_5$ and have a pre-treated cadmium content more than about 10 mg Cd/kg $P_2O_5$. In some embodiments, the wet-process phosphoric acid solution is substantially free of the precipitated calcium sulfate.

"Pre-treated cadmium content" refers to the original or initial cadmium content in the wet-process phosphoric acid solution resulted from the step (b) of the method of the invention (i.e., the phosphoric acid solution prior to the treatment by the complex reagent and the solid adsorbing material). In the invention described herein, the pre-treated cadmium content refers to a content more than about 10 mg Cd/kg $P_2O_5$.

"Complex reagent" refers to a reagent that can form a complex with a heavy metal (such as cadmium, copper, lead, nickel, arsenic, manganese, and mercury) and facilitate adsorption or adherence of the heavy metal impurities onto a solid adsorbing material. For example, the reagent may be a di-lower alkyl dithiophosphinate, di-lower alkyl dithiophosphate, lower alkyl dithioate, or lower alkyl xanthate. In some embodiments, the lower alkyl substituent is a linear or branched $C_{1-4}$ alkyl. For example, the complex reagent is an ammonium, sodium, or potassium salt of di-isobutyl dithiophosphate, di-isobutyl dithiophosphinate, 2-methylpropanedithioate, or isobutyl xanthate. When the carbon chain is prolonged (e.g., the carbon number is 5 or more), the reagent tends to precipitate in the acidic solution. In some embodiments of the invention, the complex reagent may form an oil layer on the surface of the solid adsorbing material, thereby facilitating the capture of the heavy metals, such as cadmium or arsenic.

"Adsorption," "adsorbing," or "adsorb" refers to adherence of heavy metal ions, molecules or complexes onto the surface of another substance referred to herein as a "solid adsorbing material." In the invention described herein, the complex of cadmium and the complex reagent is preferentially adsorbed onto the solid adsorbing material (e.g. calcium sulfate).

"Solid adsorbing material" refers to a material providing surfaces to allow heavy metal ions, molecules or complexes to adhere thereon, which also provides good filterability, i.e., easy to be filtered out. For example, the solid adsorbing material is calcium sulfate, aluminosilicates, activated carbon, plastic resins, diatomaceous earth (DE), perlite, or other materials that provide large amounts of surface area. In some embodiments of the invention, the solid adsorbing material may be the calcium sulfate recycled from the waste cake generated in the process of manufacturing phosphoric acid.

"Cadmium complex-contaminated solid adsorbing material" refers to the solid material resulted from treating the wet-process phosphoric acid solution with the solid adsorbing material and the complex reagent. Without being bound by theory, it is believed that the complex reagent can form a complex with cadmium and adhere onto the surface of the solid adsorbing material. In the invention described herein, the term "contaminated solid adsorbing material" can be simply understood as a complex of the complex reagent, the heavy metal impurity (e.g., cadmium), and the solid adsorbing material.

"Treated phosphoric acid solution" refers to the solution resulted from treating the wet-process phosphoric acid solution with the solid adsorbing material and the complex reagent, and then removing the contaminated solid adsorbing material. In the invention described herein, the treated phosphoric acid solution means a phosphoric acid solution with a significantly lower Cd content as compared to its pre-treated status, and substantially free of solid particles.

"Post-treated cadmium content" refers to the resulting cadmium content in the treated phosphoric acid solution. In the invention described herein, the post-treated cadmium content is at least about 10% lower than the pre-treated cadmium content. To illustrate, for example, when the pre-treated cadmium content is about 40 mg Cd/kg $P_2O_5$, the post-treated cadmium content is less than about 36 mg Cd/kg $P_2O_5$ (40−40*10%=36).

"Cadmium" is used at times in reference to an elemental or metallic state in the form in which it appears in, for example, ore, wet-process phosphoric acid solution, recycled solution, and waste cake. Where not explicitly stated, those skilled in the art are expected to appreciate the context. And unless otherwise specified, cadmium may be in its naturally occurring valence state, e.g., $Cd^{2+}$.

Throughout this document, quantities expressed in ppm are all made on a weight basis.

In some embodiments, the solid adsorbing material used in the method of the invention is calcium sulfate, aluminosilicates, activated carbon, plastic resins, diatomaceous earth, perlite, or any combination thereof. In further embodiments, the solid adsorbing material used in the method of the invention is calcium sulfate.

In some embodiments, the method of the invention further comprises a step (e) of collecting the calcium sulfate removed from the step (b), cleaning the collected calcium sulfate, and adding the cleaned calcium sulfate into the wet-process phosphoric acid solution of step (c) as the solid adsorbing material. In further embodiments of the step (e) of the invention, the cleaning step is conducted by washing the collected calcium sulfate with water.

In certain embodiments, the method of the invention further comprises a step (f) of collecting the cadmium complex-contaminated solid adsorbing material removed from the step (d), cleaning the collected contaminated calcium sulfate, and adding the cleaned calcium sulfate into the wet-process phosphoric acid solution of step (c) as the solid adsorbing material. In further embodiments of the step (f) of the invention, the cleaning step is conducted by washing the collected contaminated calcium sulfate with a cleaning solvent to remove the complex reagent and Cd from the contaminated calcium sulfate.

"Cleaning solvent" means a solvent capable of removing the complex reagent and Cd from the cadmium complex-contaminated calcium sulfate. In some embodiments, the cleaning solvent is kerosene or methanol.

In certain embodiments, the filtration step (b) of the invention is conducted by reducing the calcium sulfate generated in the step (a) to give the wet-process phosphoric acid solution containing about 0.5 to 10% (w/w) of the precipitated calcium sulfate, i.e., reducing the calcium sulfate content from about 20-40% (w/w) to about 0.5-10% (w/w). In such instances, the remaining calcium sulfate serves as the solid adsorbing material used in the step (c), i.e., the wet-process phosphoric acid solution is treated with about 0.5 to about 10% (w/w) of the remaining calcium sulfate. In some embodiments, the filtration step (b) of the invention is conducted by reducing the calcium sulfate generated in the step (a) to give the wet-process phosphoric acid solution containing from about 0.5 to about 5% (w/w), from about 0.5 to about 2.5% (w/w), from about 0.5 to about 1% (w/w), or from about 0.5 to about 0.75% (w/w), of the remaining calcium sulfate.

Figure 1B:
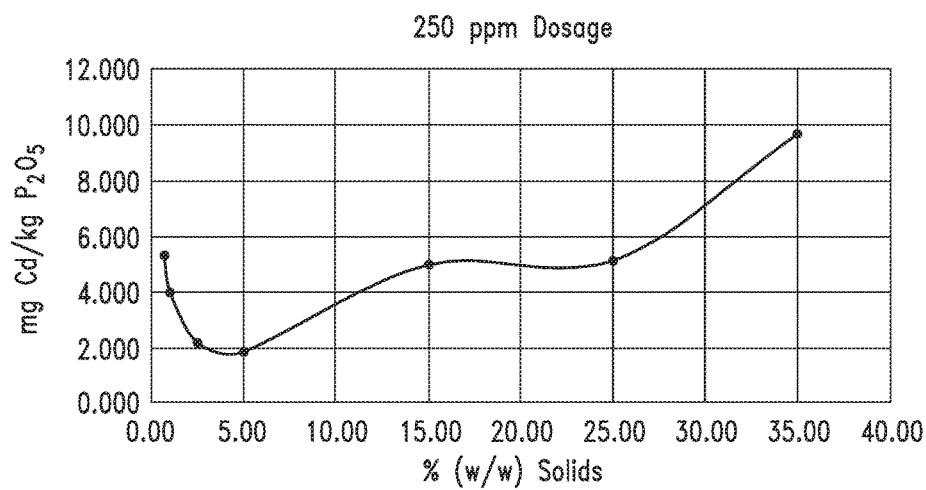

In some embodiments, for the step (c) of the invention, the wet-process phosphoric acid solution is treated with about 0.5 to 5% (w/w) of the solid adsorbing material. In some embodiments, for the step (c) of the invention, the wet-process phosphoric acid solution is treated with about 0.5 to 2.5% (w/w) of the solid adsorbing material. In certain embodiments, for the step (c) of the invention, the wet-process phosphoric acid solution is treated with from about 0.5 to about 1% (w/w) of the solid adsorbing material. In further embodiments, the wet-process phosphoric acid solution is treated with from about 0.5 to about 0.75% (w/w) of the solid adsorbing material. As shown in FIGS. 1A and 1B, it has been found that when the solid content (i.e., the amount of solid adsorbing material) is controlled at about 0.5 to about 10% (w/w), a significantly improved Cd removal rate can be obtained. Further, the reduced amount of solids used in treating the phosphoric acid solution can result in less amount of Cd-contaminated waste cake. It has also been found that, when the solid content is controlled at the range of about 0.5 to about 5% (w/w), the Cd removal efficiency can be further improved As shown in Example 1 and Example 2, it has also been found that when the solid content is controlled at the range of about 0.5 to about 1% (w/w), the Cd adsorption efficiency of the solid adsorbing material can be significantly increased (e.g. the Cd content in calcium sulfate cake is greater than 1000 ppm). Further, in the context of plant operation, a solid content of about 0.5 to about 0.75% (w/w) can give the most desirable overall operating performance. The reduced amount of the solid adsorbing material (compared to the internally generated large amount of solid particles, i.e., about 20-40% (w/w) precipitated calcium sulfate) requires less amount of the complex reagent and produces significantly less amount of Cd-contaminated waste cake.

Accordingly, in more specific embodiments, the invention provides a method for manufacturing phosphoric acid from a calcium- and cadmium-containing phosphate ore, comprising the steps of: (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 25 to about 40% (w/w); (b) removing the calcium sulfate from the aqueous mixture to give a wet-process phosphoric acid solution containing from about 20 to about 40% (w/w) $P_2O_5$ and having a pre-treated cadmium content more than about 20 mg Cd/kg $P_2O_5$; (c) treating the wet-process phosphoric acid solution with from about 0.5 to about 5% (w/w) of a solid adsorbing material and from about 175 to about 500 ppm (by weight on a 100% basis) of a complex reagent to form a cadmium complex-contaminated solid adsorbing material; and (d) removing the cadmium complex-contaminated solid adsorbing material from the phosphoric acid solution to yield a treated phosphoric acid solution having having a post-treated cadmium content at least about 20% lower than the pre-treated cadmium content.

In some embodiments, the complex reagent used in the method of the invention has the following structure of formula (I):

wherein Q is a bond or O; $R_1$ and $R_2$ are independently H, or a linear or branched $C_{1-4}$ alkyl, wherein at least one of $R_1$ and $R_2$ is not H; and X is H, an alkali metal or ammonium.

When Q is a bond, the complex reagent is a dithiophosphinate. When Q is O, the complex reagent is a dithiophosphate. In some embodiments, $R_1$ and $R_2$ are independently a linear $C_{1-4}$ alkyl, such as methyl, ethyl, n-propyl or n-butyl. In other embodiments, $R_1$ and $R_2$ are independently a branched $C_{1-4}$ alkyl, such as isopropyl or isobutyl. In some embodiments, $R_1$ is H and $R_2$ is a linear $C_{1-4}$ alkyl, such as methyl, ethyl, n-propyl or n-butyl. In other embodiments, $R_1$ is H and $R_2$ is a branched $C_{1-4}$ alkyl, such as isopropyl or isobutyl.

In some embodiments, X is an alkali metal, such as lithium, sodium, potassium, rubidium, caesium or francium. In other embodiments, X is ammonium.

In some embodiments, $R_1$ and $R_2$ are isobutyl and X is ammonium, sodium or potassium. For example, the complex reagent may be ammonium di-isobutyl dithiophosphate, ammonium di-isobutyl dithiophosphinate, sodium di-isobutyl dithiophosphate, sodium di-isobutyl dithiophosphinate, potassium di-isobutyl dithiophosphate, or potassium di-isobutyl dithiophosphinate. In other embodiments, $R_1$ is H and $R_2$ is isobutyl. For example, the complex reagent may be ammonium isobutyl dithiophosphate, ammonium isobutyl dithiophosphinate, sodium isobutyl dithiophosphate, sodium isobutyl dithiophosphinate, potassium isobutyl dithiophosphate, or potassium isobutyl dithiophosphinate.

In certain embodiments, the complex reagent used in the method of the invention is sodium di-isobutyl dithiophosphinate, sodium di-isobutyl dithiophosphates, or ammonium di-isobutyl dithiolphosphate, where the complex reagent may form an oil layer on the surface of the solid adsorbing material, thereby facilitating the capture of cadmium from the phosphoric acid solution by the solid adsorbing material. In such instances, the oil layer may adhere to not only the solid adsorbing materials but also any equipment, tanks and pipe lines that it is exposed to. The lower solid content as used in the method of the invention will reduce the required amount of the complex reagent, thereby minimizing the hazardous effects that the reagent may impose upon people working in the plant.

In further embodiments, the complex reagent used in the method of the invention is an ammonium di-lower alkyl dithiophosphinate or dithiophosphate, such as ammonium di-isobutyl dithiophosphinate or ammonium di-isobutyl dithiophosphate. The ammonium salt of dithiophosphinate or dithiophosphate may remain in a dry solid form with no vapor pressure or odor and can dissolve easily in water. In contrast, the sodium salt of dithiophosphinate or dithiophosphate may form a high pH aqueous solution with strong odors and is normally sold at high concentrations (e.g., 50%). In some embodiments, it is advantageous for plant operators to handle the ammonium salts in solid form, as opposed to liquids. Further, the sodium salt of dithiophosphinate is a relatively expensive chemical, costing about four times that of the ammonium salt of dithiophosphate.

In some embodiments, the complex reagent used in the method of the invention has the following structure of formula (II):

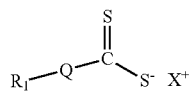
(II)

wherein Q is a bond or O; $R_1$ is a linear or branched $C_{1-4}$ alkyl; and X is H, an alkali metal or ammonium.

When Q is a bond, the complex reagent is a dithioate. When Q is O, the complex reagent is a xanthate. In some embodiments, $R_1$ is a linear $C_{1-4}$ alkyl, such as methyl, ethyl, n-propyl or n-butyl. In other embodiments, $R_1$ is a branched $C_{1-4}$ alkyl, such as isopropyl or isobutyl. In some embodiments, X is an alkali metal, such as lithium, sodium, potassium, rubidium, caesium or francium. In other embodiments, X is ammonium.

In some embodiments, Q is O, $R_1$ is isobutyl and X is potassium or sodium. For example, the complex reagent may be potassium isobutyl xanthate or sodium isobutyl xanthate. In some embodiments, Q is a bond, $R_1$ is isopropyl and X is potassium or sodium. For example, the complex reagent may be sodium 2-methylpropanedithioate, or potassium 2-methylpropanedithioate.

In certain embodiments, for the step (c) of the invention, the wet-process phosphoric acid solution is treated with from about 150 to about 750 ppm, from about 150 to about 500 ppm, or from about 150 to about 250 ppm, from about 175 to about 300 ppm, from about 200 to about 300 ppm, from about 250 to about 500 ppm, or from about 300 to about 500 ppm, of the complex reagent. As shown in Table 3 and Table 4, it has been found that when the content of the complex reagent is controlled at about 150 ppm, the Cd removal rate can reach to at least about 10%. As the dosage rate of the complex reagent increases, the Cd removal rate also increases to about 20%, about 40%, about 60%, about 80%, about 90%, or about 95%. The dosage rate may be adjusted based on the pre-treated Cd content. When the pre-treated Cd content is greater, the more the dosage rate is used.

In some embodiments, in the step (c) of the method of the invention, the wet-process phosphoric acid solution is treated with from about 0.5% to about 5% (w/w) of the solid adsorbing material and from about 150 to about 500 ppm (by weight on a 100% basis) of the complex reagent. In further embodiments, the content of the complex reagent is about 300 to about 500 ppm.

In other embodiments, in the step (c) of the method of the invention, the wet-process phosphoric acid solution is treated with from about 0.5 to about 1% (w/w) of the solid adsorbing material and from about 150 to about 500 ppm (by weight on a 100% basis) of the complex reagent. In further embodiments, the content of the complex reagent is about 200 to about 300 ppm, or about 250 ppm.

In certain embodiments, in the step (c) of the method of the invention, the wet-process phosphoric acid solution is treated with from about 0.5 to about 0.75% (w/w) of the solid adsorbing material and from about 150 to about 500 ppm (by weight on a 100% basis) of the complex reagent. In further embodiments, the content of the complex reagent is about 200 to about 300 ppm, or about 250 ppm.

In some embodiments, when the solid content is greater, the dosage rate of the complex reagent needs to be higher to obtain the desirable Cd content. Accordingly, in such embodiments, for the step (c) of the invention, the wet-process phosphoric acid solution is treated with from about 1 to about 5% (w/w) of the solid adsorbing material and from about 250 to about 500 ppm (by weight on a 100% basis) of the complex reagent. In further embodiments, the wet-process phosphoric acid solution is treated with from about 1 to about 5% (w/w) of the solid adsorbing material and from about 300 to about 500 ppm (by weight on a 100% basis) of the complex reagent. In other embodiments, for the step (c) of the invention, the wet-process phosphoric acid solution is treated with from about 5 to about 10% (w/w) of the solid adsorbing material and from about 250 to about 900 ppm (by weight on a 100% basis) of the complex reagent. In further embodiments, the wet-process phosphoric acid solution is treated with from about 5 to about 10% (w/w) of the solid adsorbing material and from about 300 to about 900 ppm (by weight on a 100% basis) of the complex reagent.

As used herein, "dosage rate" means the content of the complex reagent used in the method of the invention, calculated in ppm.

In some embodiments, for the step (c) of the invention, the wet-process phosphoric acid solution is treated with from about 0.5 to about 1% (w/w) of the solid adsorbing material and from about 175 to about 300 ppm (by weight on a 100% basis) of the complex reagent. In further embodiments, the wet-process phosphoric acid solution is treated with from about 0.5 to about 1% (w/w) of the solid adsorbing material and from about 200 to about 300 ppm (by weight on a 100% basis) of the complex reagent. In more specific embodiments, the wet-process phosphoric acid solution is treated with from about 0.5 to about 1% (w/w) of the solid adsorbing material and about 250 ppm (by weight on a 100% basis) of the complex reagent.

In some embodiments, for the step (c) of the invention, the wet-process phosphoric acid solution is treated with from about 0.5 to about 0.75% (w/w) of the solid adsorbing material and from about 175 to about 300 ppm (by weight on a 100% basis) of the complex reagent. In further embodiments, the wet-process phosphoric acid solution is treated with from about 0.5 to about 0.75% (w/w) of the solid adsorbing material and from about 200 to about 300 ppm (by weight on a 100% basis) of the complex reagent. In more specific embodiments, the wet-process phosphoric acid solution is treated with from about 0.5 to about 0.75% (w/w) of the solid adsorbing material and about 250 ppm (by weight on a 100% basis) of the complex reagent.

In certain embodiments, for the step (c) of the invention, the wet-process phosphoric acid solution is treated with from about 0.5 to about 2.5% (w/w) of the solid adsorbing material and from about 175 to about 500 ppm (by weight on a 100% basis) of the complex reagent. In some embodiments, for the step (c) of the invention, the wet-process phosphoric acid solution is treated with from about 0.5 to about 2.5% (w/w) of the solid adsorbing material and from about 175 to about 300 ppm (by weight on a 100% basis) of the complex reagent. In further embodiments, the wet-process phosphoric acid solution is treated with from about 0.5 to about 2.5% (w/w) of the solid adsorbing material and from about 200 to about 300 ppm (by weight on a 100% basis) of the complex reagent. In more specific embodiments, the wet-process phosphoric acid solution is treated with from about 0.5 to about 2.5% (w/w) of the solid adsorbing material and about 250 ppm (by weight on a 100% basis) of the complex reagent.

In some embodiments, for the digestion step (a) of the invention, the calcium- and cadmium-containing phosphate ore is treated with about 80%, about 93% or about 98% sulfuric acid.

In certain embodiments, the content of calcium sulfate in the aqueous mixture resulted from the digestion step (a) of the invention is about 30 to 35% (w/w), or about 35% (w/w). In some embodiments, for the step (b) of the invention, the wet-process phosphoric acid solution contains from about 22 to about 32% (w/w) $P_2O_5$, or from about 26 to about 30% (w/w) $P_2O_5$, or about 28% (w/w) $P_2O_5$, or about 40% (w/w) $P_2O_5$. The contents of calcium sulfate and $P_2O_5$ in the phosphoric acid solution are determined and controlled by the plant operator to optimize the overall performance of the plant either for throughput, efficiency and the best combination of efficiency and throughput.

In certain embodiments, for the step (b) of the invention, the wet-process phosphoric acid solution contains more than about 40 mg Cd/kg $P_2O_5$, about 60 mg Cd/kg $P_2O_5$, about 80 mg Cd/kg $P_2O_5$, about 100 mg Cd/kg $P_2O_5$, or about 200 mg Cd/kg $P_2O_5$. As noted above, the Cd content varies depending on the mining sites of phosphate rocks. The invention aims to provide a method of manufacturing phosphoric acid from a calcium- and cadmium-containing phosphate ore, which can meet the desirable limit on Cd content in the intended final products.

In some embodiments, the method of the invention further comprises a step (g) of concentrating the treated phosphoric acid solution of step (d) to give a concentrated acid solution having from about 40% to about 54% (w/w) $P_2O_5$. For example, the concentration step (g) can be conducted by conventional evaporation technique.

In some embodiments, the step (c) of the invention is conducted in a mixing tank (or reactor). For example, the predetermined amounts of the complex reagent and the solid adsorbing material are added into the tank, and then the resulting solution is pumped through a filter press (e.g., a plate and frame filter) to achieve the solid/liquid separation (i.e., the step (d)). Plate and frame filters have multiple plates that contain cavities to be filled with solids during a filtration cycle. The plates are held together by a hydraulic ram that seals the unit. When solids have filled the cavities, the ram is released and the plates are separated. Usually the solids will fall off in sheets into a catch pan or on a conveyor. The plate and frame filter is well-known to one of ordinary skill in the art, and the exact type or design of the filter useful in practice of the invention is not limited.

In some embodiments, for the step (c) of the invention, the wet-process phosphoric acid solution is treated with the solid adsorbing material and the complex reagent for at least about 3 seconds, about 10 seconds, about 0.5 to 5 minutes, about 1 to 3 minutes, or about 3 minutes. In other embodiments, all of the steps are performed at about 20-80° C., about 20-60° C., about 20-50° C., about 20-30° C., or about ambient room temperature. The treating time and temperature may be adjusted based on the pre-treated Cd content. When the pre-treated Cd content is greater, the treating time may be prolonged.

In certain embodiments, for the step (d) of the invention, the post-treated cadmium content is at least about 20%, about 40%, about 60%, about 80%, about 90%, or about 95%, lower than the pre-treated cadmium content. In more specific embodiments, the treated phosphoric acid solution contains less than about 20 mg Cd/kg $P_2O_5$, about 15 mg Cd/kg $P_2O_5$, about 10 mg Cd/kg $P_2O_5$, about 5 mg Cd/kg $P_2O_5$, or about 3 mg Cd/kg $P_2O_5$.

In some embodiments, for the step (c) of the invention, the cadmium complex-contaminated solid adsorbing material has more than about 1000 ppm Cd adsorbed thereon, or more than 1500, 2000, 2500, 3000 or 3500 ppm. As shown in Table 2, it has been found that when the solid content is further reduced to 0.6% (w/w) from 1% (w/w), the Cd adsorption efficiency of the solid adsorbing material can be tripled (e.g., Cd content in the filter cake increased from 1320 ppm to 3910 ppm).

In some embodiments, for the step (d) of the invention, the resulting contaminated solid adsorbing material may be removed by a conventional filtration step, e.g., by a plate and frame filter. In some more specific embodiments, the solid content is controlled at no greater than 0.75% (w/w), e.g. from about 0.5% to about 0.75% (w/w), to achieve the most desirable overall operating performance of the plate and frame filter.

In one aspect, the invention also provides a method for removing other heavy metals present in the phosphate ore from the phosphoric acid solution. In some embodiments of the method of the invention, the calcium- and cadmium-containing phosphate ore further comprises one or more heavy metals other than cadmium, and the method further comprises forming a complex-contaminated solid adsorbing material containing the one or more heavy metals in the step (c), and removing the complex-contaminated solid adsorbing material from the phosphoric acid solution to yield the treated phosphoric acid solution in the step (d). In further embodiments, the one or more heavy metals are copper, lead, nickel, arsenic, manganese, mercury, or any combination thereof. The heavy metals other than cadmium are removed from the phosphoric acid solution in the manner similar to how the cadmium impurity is removed. In such instances, the wet-process phosphoric acid solution (containing the additional heavy metals) is treated with the solid adsorbing material and the complex reagent to form a complex-contaminated solid adsorbing material containing the additional heavy metals. The contaminated solid adsorbing material is then removed from the phosphoric acid solution to yield a treated phosphoric acid solution having a lower content of the additional heavy metals as compared with the pre-treated phosphoric acid solution.

In more specific embodiments, the invention provides a method for removing arsenic from the phosphoric acid solution. In some embodiments, for the step (c) of the method of the invention, the wet-process phosphoric acid solution (containing arsenic) is treated with from about 300 to about 500 ppm (by weight on a 100% basis) of the complex reagent, further wherein the complex reagent is an ammonium, sodium, or potassium salt of di-isobutyl dithiophosphinate. In certain embodiments, the As removal rate is more than about 10%, about 20%, about 50%, or about 95%.

As used herein, copper, lead, nickel, arsenic, manganese, or mercury is referred as in an elemental or metallic state in the form in which it appears in, for example, ore, wet-process phosphoric acid solution, recycled solution, and waste cake. Where not explicitly stated, those skilled in the art are expected to appreciate the context. And unless otherwise specified, each of the heavy metals may be in its naturally occurring valence state.

"Complex-contaminated solid adsorbing material" refers to the solid material resulted from treating the wet-process phosphoric acid solution with the solid adsorbing material and the complex reagent. To illustrate, when the phosphate ore contains cadmium and arsenic, the phosphoric acid solution resulted from the step (c) of the method of the invention contains the cadmium complex-contaminated solid adsorbing material and the complex-contaminated solid adsorbing material containing arsenic. The step (d) of the method of the invention then removes both the cadmium complex-contaminated solid adsorbing material and the complex-contaminated solid adsorbing material containing arsenic from the phosphoric acid solution to yield the treated phosphoric acid solution having lower Cd and As contents. In the context of the invention, a contaminated solid adsorbing material can be understood as a solid adsorbing material having a complex of cadmium and the complex reagent, and/or a complex of any of the additional heavy metal impurities (e.g., arsenic) and the complex reagent, adhered thereon.

In more specific embodiments, the invention provides a method for manufacturing phosphoric acid from a calcium- and cadmium-containing phosphate ore, comprising the steps of: (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 30 to about 35% (w/w); (b) removing the calcium sulfate from the aqueous mixture to give a wet-process phosphoric acid solution containing from about 26 to about 30% (w/w) $P_2O_5$ and having a pre-treated cadmium content more than about 40 mg Cd/kg $P_2O_5$; (c) treating the wet-process phosphoric acid solution with from about 0.5 to about 1% (w/w) of a solid adsorbing material and from about 200 to about 300 ppm (by weight on a 100% basis) of a complex reagent to form a cadmium complex-contaminated solid adsorbing material; and (d) removing the cadmium complex-contaminated solid adsorbing material from the phosphoric acid solution to yield a treated phosphoric acid solution having a post-treated cadmium content at least about 80% lower than the pre-treated cadmium content. In further embodiments, the solid adsorbing material is calcium sulfate, and the complex reagent is an ammonium, sodium, or potassium salt of di-isobutyl dithiophosphate, di-isobutyl dithiophosphinate, 2-methylpropanedithioate, or isobutyl xanthate.

The solid content and the dosage rate of the complex reagent employed in the method of the invention may be adjusted in view of the pre-treated Cd content. In some embodiments, the invention provides a method for manufacturing phosphoric acid from a calcium- and cadmium-containing phosphate ore, comprising the steps of: (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated cadmium content more than about 10 mg Cd/kg $P_2O_5$; (c) treating the wet-process phosphoric acid solution with from about 0.5 to about 25% (w/w) of a solid adsorbing material and from about 100 to about 1000 ppm (by weight on a 100% basis) of a complex reagent to form a cadmium complex-contaminated solid adsorbing material; and (d) removing the cadmium complex-contaminated solid adsorbing material from the phosphoric acid solution to yield a treated phosphoric acid solution having a post-treated cadmium content at least about 10% lower than the pre-treated cadmium content.

Chemical processing plants for manufacturing phosphoric acid can readily be configured to operate according to the aforementioned methods. Accordingly, in some embodiments of the invention, a chemical processing plant for manufacturing phosphoric acid from a calcium- and cadmium-containing phosphate ore is provided, comprising:

a digester for performing the step (a);

a first filter for performing the step (b), wherein the first filter is connected to the digester;

a reactor for performing the step (c), wherein the reactor is connected to the first filter; and a plate and frame filter for performing the step (d), wherein the plate and frame filter is connected to the reactor.

EXAMPLES

In order that this invention may be more fully understood, the following examples are set forth. These examples are for the purpose of illustrating embodiments of this invention, and are not to be construed as limiting the scope of the invention in any way. The reactants used in the examples below may be obtained either as described herein, or if not described herein, are themselves either commercially available or may be prepared from commercially available materials by methods known in the art.

Example 1

Filtration Study with Various Amounts of Calcium Sulfate

This study aims to evaluate the effect of the solid content (i.e., the amounts of calcium sulfate) in removing Cd from a wet-process phosphoric acid solution. The design with the application of a filter intends to simulate the filling of a plate and frame filter.

Multiple batches of wet-process phosphoric acid solutions ("Acid") and various amounts of calcium sulfate ("Solid") and Reagent #4 ("Reagent") were mixed according to the amounts listed in the following Table 1A in a reactor and then filtered on a filter to allow the calcium sulfate to accumulate to a certain depth or thickness. "Reagent #4" represented ammonium di-isobutyl dithiophosphate. In this study, the amount of calcium sulfate on the filter was set to about 20-22 g. As shown in Table 1A, two groups of the study were conducted, one group was treated with 175 ppm of Reagent #4 (the complex reagent), the other with 250 ppm of Reagent #4.

TABLE 1A

Conditions for the filtration study

| Solid % (w/w) | Acid (g) | Solid (g) | Reagent (g) | Solid on filter (g) |
|---|---|---|---|---|
| Reagent #4: 175 ppm (listed amount of 5% base solution) | | | | |
| 35.00 | 40 | 21.54 | 0.14 | 21.54 |
| 25.00 | 65 | 21.67 | 0.23 | 21.67 |
| 15.00 | 122 | 21.54 | 0.43 | 21.54 |
| 5.00 | 100 | 5.26 | 0.35 | 21.05 |
| 2.50 | 200 | 5.26 | 0.70 | 21.05 |
| 1.00 | 200 | 2.02 | 0.70 | 20.20 |
| 0.75 | 200 | 1.51 | 0.70 | 21.16 |

TABLE 1A-continued

Conditions for the filtration study

| Solid % (w/w) | Acid (g) | Solid (g) | Reagent (g) | Solid on filter (g) |
|---|---|---|---|---|
| Reagent #4: 250 ppm (listed amount of 5% base solution) | | | | |
| 35.00 | 40  | 21.54 | 0.20 | 21.54 |
| 25.00 | 65  | 21.67 | 0.33 | 21.67 |
| 15.00 | 122 | 21.54 | 0.61 | 21.54 |
| 5.00  | 100 | 5.26  | 0.50 | 21.05 |
| 2.50  | 200 | 5.26  | 1.00 | 21.05 |
| 1.00  | 200 | 2.02  | 1.00 | 20.20 |
| 0.75  | 200 | 1.51  | 1.00 | 21.16 |

The first test (with 35% (w/w) Solid) in the 175 ppm group was conducted according to the following procedure. About 40 g of wet-process phosphoric acid solution (containing about 28-30% (w/w) $P_2O_5$) and about 21.54 g of dry calcium sulfate were introduced into a reactor. Into the same reactor, about 175 ppm (by weight on a 100% basis) of Reagent #4 was also added (i.e., about 0.14 g of 5% base solution of Reagent #4). After agitation at ambient room temperature for about 1 to 3 minutes, the mixture was filtered till the amount of calcium sulfate on the filter reached to the predetermined depth or thickness (and the quantity was measured to be about 21.54 g). Other tests were conducted in the same manner with various amounts of Acid, Solid and Reagent as listed in Table 1A. The tests were conducted by using 5% base solution of the reagents. For example, to make a 5% solution of Reagent #4, 5 grams of the reagent powder are added to 95 grams of water. The dosage rates were calculated in ppm using the following formula.

[(grams of reagent)×(base solution concentration)/(grams of acid treated)]×1,000,000

Example: (0.3 g×0.05)/100 g×1,000,000=150 ppm (i.e., 150 ppm=adding 0.3 g of 5% base solution of the reagent into a 100 g acid solution)

Cd Removal with Various Amounts of Calcium Sulfate

Resulting filtered acid solutions were analyzed for $P_2O_5$ and Cd contents. Results were reported with Cd concentration in ppm, $P_2O_5$ reported in % (w/w), and the Cd to $P_2O_5$ ratio reported as mg Cd/kg $P_2O_5$.

mg Cd/kg $P_2O_5$=ppm Cd/% $P_2O_5$×100

The results of analyzing the resulting filtered acid solutions are summarized in the following Table 1B and shown in FIGS. 1A and 1B. It has been observed that when the solid content (the amounts of added calcium sulfate) was reduced, the Cd removal efficiency was significantly improved. For example, when the solid content is controlled at the range of about 0.5 to about 10%, the Cd removal efficiency is significantly improved. When reducing the solid content to lower than about 5%, the Cd removal efficiency is further improved. To see this, compare the results between the tests with 15% (w/w) solids and with 5% (w/w) solids. The fewer amounts the calcium sulfate are used, the less Cd-contaminated waste cakes are produced. Accordingly, it is beneficial to employ a lower solid content without compromising the desirable Cd removal efficiency.

TABLE 1B

Cd removal with various amounts of Solid

| Solid % (w/w) | $P_2O_5$% (w/w) | Cd (ppm) | mg Cd/kg $P_2O_5$ |
|---|---|---|---|
| Reagent #4: 175 ppm | | | |
| 35.00 | 28.92 | 6.53 | 22.58 |
| 25.00 | 29.2  | 3.98 | 13.63 |
| 15.00 | 28.87 | 2.98 | 10.32 |
| 5.00  | 28.93 | 1.27 | 4.39  |
| 2.50  | 28.71 | 1.33 | 4.63  |
| 1.00  | 28.48 | 0.92 | 3.23  |
| 0.75  | 28.53 | 1.93 | 6.77  |
| Reagent #4: 250 ppm | | | |
| 35.00 | 29.22 | 2.82 | 9.65 |
| 25.00 | 28.59 | 1.46 | 5.11 |
| 15.00 | 28.69 | 1.43 | 4.98 |
| 5.00  | 28.45 | 0.53 | 1.86 |
| 2.50  | 28.99 | 0.63 | 2.17 |
| 1.00  | 28.98 | 1.17 | 4.04 |
| 0.75  | 29.15 | 1.55 | 5.32 |

Cd Content in Calcium Sulfate Cakes and Wash Waters

For the group treated with 175 ppm of Reagent #4, the calcium sulfate cakes (the filtered solids) were washed with DI water, dried at 105° C., and collected. The calcium sulfate cakes and the wash waters were analyzed for Cd content. The analysis results are summarized in the following Table 1C. It has been observed that when the solid content was less than about 5% (w/w), the Cd adsorption efficiency of calcium sulfate was significantly improved (e.g., from 87 to 356 ppm for reducing the solid content from 15 to 5% (w/w)). When the solid content was further reduced to 0.75% (w/w), the Cd adsorption efficiency of calcium sulfate was also further improved (e.g. to 2470 ppm).

TABLE 1C

Cd content in the filtered cake and wash water

| Solid % (w/w) | Cd in wash water (ppm) | Cd in calcium sulfate cake (ppm) |
|---|---|---|
| 35.00 | 4.54 | 13   |
| 25.00 | 5.33 | 30   |
| 15.00 | 5.35 | 87   |
| 5.00  | 2.59 | 356  |
| 2.50  | 0.98 | 726  |
| 1.00  | 0.33 | 1940 |
| 0.75  | 0.98 | 2470 |

Example 2

Filtration Study with a Solid Content Lower than about 1% (W/W)

A filtration study similar to Example 1 was conducted with a solid content lower than about 1% (w/w). Wet-process phosphoric acid solutions (about 26-28% (w/w) $P_2O_5$), 250 ppm of Reagent #1, and various amounts of calcium sulfate ("Solid", at about 0.6-1% (w/w)) were mixed, filtered, and then analyzed according to the procedures noted in Example 1. In this study, the As content in the resulting samples was also analyzed. "Reagent #1" represents the sodium di-isobutyl dithiophosphinate. The analysis results are summarized in the following Table 2. "Acid at start" means the wet-process phosphoric acid solution prior to the treatment. "Treated Acid" means the resulting filtered acid solution.

"Filter cake" means the filtered calcium sulfate cake. Consistent with the results of Example 1, it has been further observed that when the solid content was controlled at about 0.6% (w/w), the Cd adsorption efficiency of calcium sulfate was tripled as compared with that of the sample having 1% (w/w) Solid (increased from 1320 to 3910 ppm). Similar to the Cd removal results, the As removal rate and As adsorption efficiency of calcium sulfate were improved when the solid content was reduced to about 0.6% (w/w) from about 1% (w/w). Lower solid content improves the Cd removal efficiency of the complex reagent and helps to concentrate the heavy metal impurities on the solid adsorbing materials for disposal.

TABLE 2

Cd removal with a solid content lower than about 1% (w/w)

| Tested sample | $P_2O_5$% (w/w) | Cd (ppm) | mg Cd/kg $P_2O_5$ | As (ppm) |
|---|---|---|---|---|
| 1% (w/w) Solid | | | | |
| Acid at start | 26.78 | 22.3 | 83.3 | 9.3 |
| Treated Acid | 26.97 | 2.27 | 8.4 | 9.2 |
| Filtered cake | | 1320 | | 10.5 |
| 0.75% (w/w) Solid | | | | |
| Acid at start | 27.9 | 20.9 | 74.9 | 8.8 |
| Treated Acid | 27.79 | 1.6 | 5.8 | 0.7 |
| Filtered cake | | 2040 | | 927 |
| 0.6% (w/w) Solid | | | | |
| Acid at start | 27.9 | 20.9 | 74.9 | 8.8 |
| Treated Acid | 28.37 | 2.8 | 9.9 | 0.3 |
| Filtered cake | | 3910 | | 1060 |

Simulation of a Plate and Frame Filter

Figure 2:
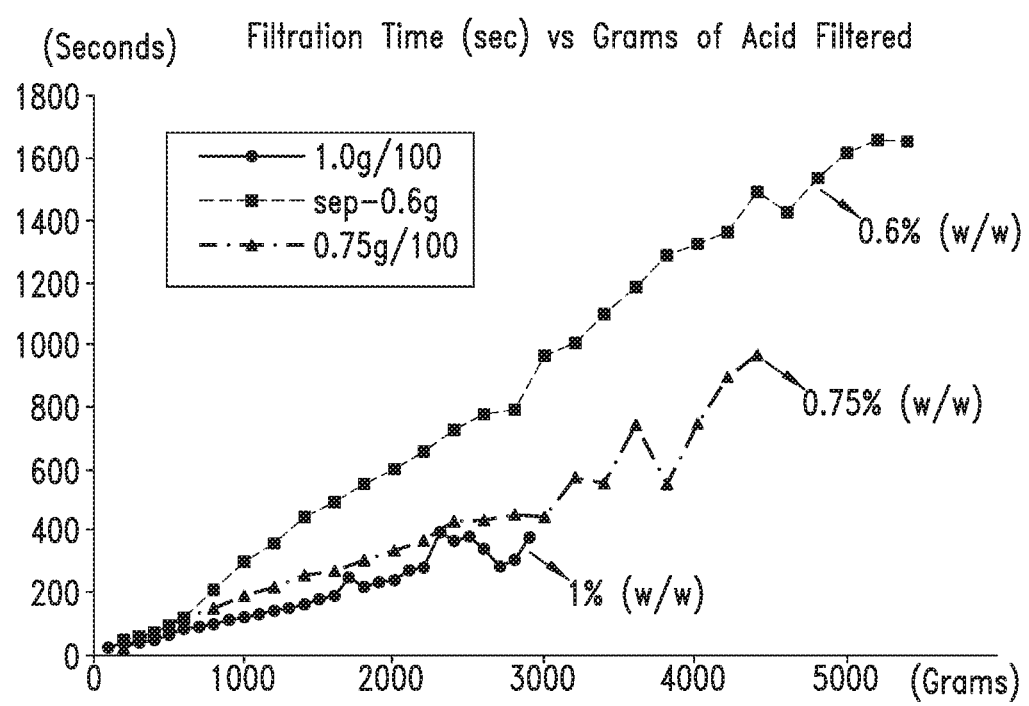
FIG. 2 shows plots of the weight of the phosphoric acid solution filtered (grams) versus the filtration time (seconds) in an exemplary experiment of the present invention.

In this test, the resulting mixture was filtered on a lab-scale filter, allowing the calcium sulfate to accumulate to a thickness of about 32 mm. The results of the filter simulation are shown in FIG. 2 (the unit for the Y axis means "seconds per batch of acid" and for the X axis "total amount of acid filtered in grams"). Several these tests with various solids loadings were performed to evaluate the desirable cycle time and filtration rates applicable in a plate and frame filter setting. Based on the test results, it has been found that about 0.5% to 0.75% solids loading gave the most desirable overall operating performance of the filter.

Example 3

Profile Study of Various Complex Reagents

Profile studies were performed with various dosage rates of complex reagents, using about 5% (w/w) solid adsorbing material (calcium sulfate) as the collector. In another study, it has been found that, to obtain the desirable results, as the amount of solid adsorbing material present increased, the dosage rate of the complex reagent also increased.

About 100 g of wet-process phosphoric acid solution (containing about 28-30% (w/w) $P_2O_5$) and about 5 g of dry calcium sulfate were introduced into a reactor. Into the same reactor, about 50-900 ppm (by weight on a 100% basis) of one of the listed complex reagents was also added. After agitation at ambient room temperature for about 1 to 3 minutes, the mixture in each test was filtered and analyzed for cadmium (Cd) and arsenic (As) contents.

Figure 3A:
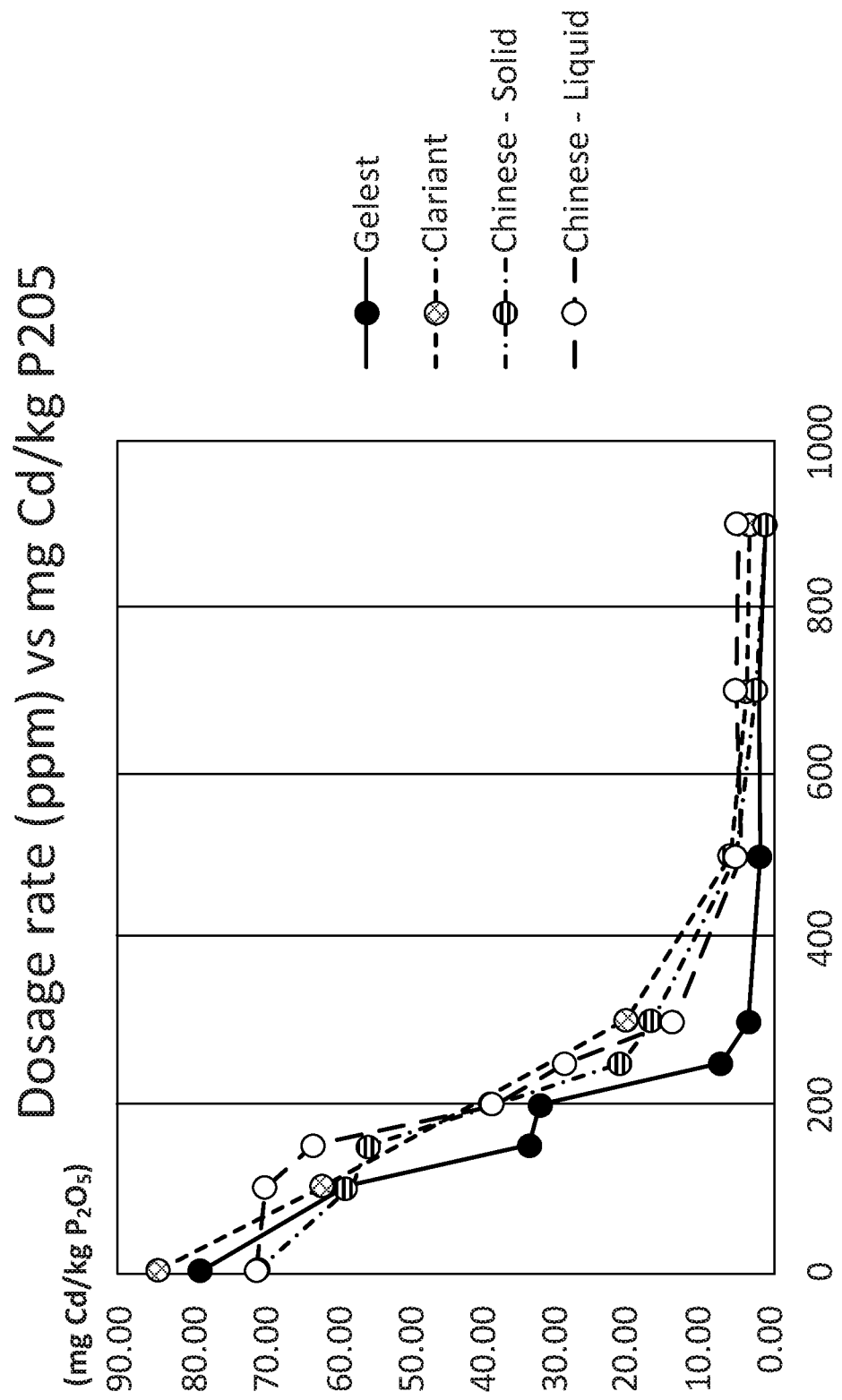
FIGS. 3A and 3B show, respectively, plots of the weight of heavy metal impurities removed (mg Cd/kg $P_2O_5$ for FIG. 3A; mg As/kg $P_2O_5$ for FIG. 3B) versus various amounts of different complex reagents added (ppm) in an exemplary experiment of the present invention.
Figure 3B:
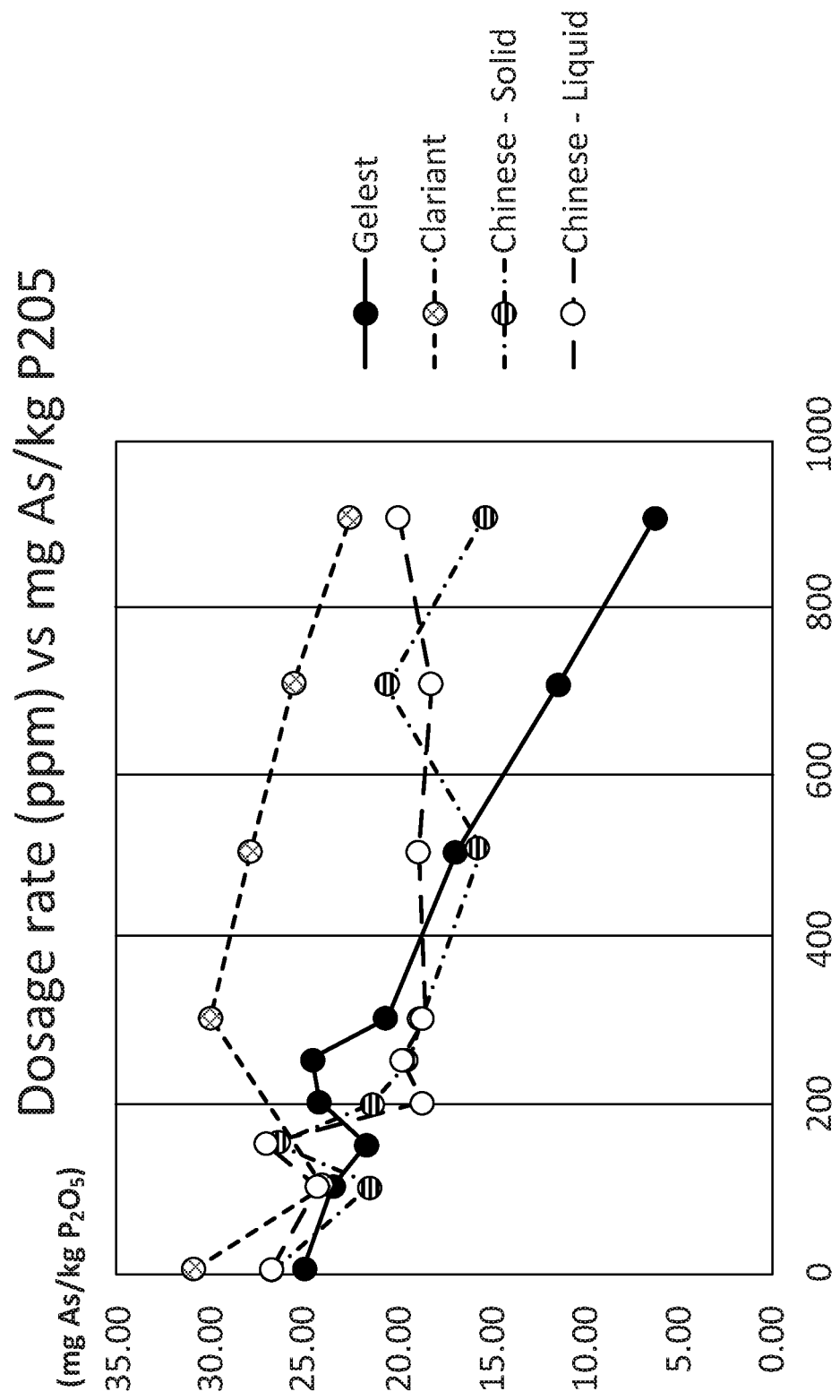

The results of this study are summarized in Table 3 below and shown in FIGS. 3A and 3B. The one labeled "Reagent #1" was the sodium di-isobutyl dithiophosphinate. The ones labeled "Reagent #2" and "Reagent #3" were sodium di-isobutyl dithiophosphates from different vendors. The "Reagent #4" was ammonium di-isobutyl dithiophosphate. All the tests were conducted using 5% base solution for the reagents. The results indicate that when a small amount (e.g. about 5% (w/w)) of solid adsorbing material (calcium sulfate) was used, the complex reagents can remove at least about 10% of the heavy metal impurities with the dosage rate as less as 150 ppm. When the dosage rate increases, the Cd removal rate also increases. For example, the Cd removal rate can reach at least 40% when 200 ppm of the complex reagent was used to treat the wet-process phosphoric acid solution. Further, all tested complex reagents exhibit good Cd removal efficiency when the dosage rate was about 250 ppm. At such dosage rate, sodium di-isobutyl dithiophosphinate can reduce the Cd content to below 10 mg Cd/kg $P_2O_5$, while ammonium di-isobutyl dithiophosphate can reduce the Cd content to about 20 mg Cd/kg $P_2O_5$. As shown in FIG. 3B, it has also been observed that when the dosage rate of the complex reagent is controlled at about or greater than 300 ppm, the As removal efficiency can be significantly improved.

TABLE 3

Cd removal with various complex reagents and various amounts thereof

| Dosage (ppm) | $P_2O_5$% (w/w) | Cd (ppm) | mg Cd/kg $P_2O_5$ | Cd removal rate % |
|---|---|---|---|---|
| Reagent #1 | | | | |
| 0 | | | 83.3 | |
| 50 | 26.81 | 13.7 | 51.10 | 39% |
| 100 | 27.42 | 13.1 | 47.78 | 43% |
| 200 | 26.99 | 11.2 | 41.50 | 50% |
| 300 | 26.89 | 2.1 | 7.81 | 91% |
| 500 | 27.02 | 0.76 | 2.81 | 97% |
| 700 | 26.89 | 1.4 | 5.21 | 94% |
| 900 | 27.24 | 1.4 | 5.14 | 94% |
| Reagent #2 | | | | |
| 0 | 28.38 | 24.1 | 84.92 | |
| 100 | 28.83 | 17.94 | 62.23 | 27% |
| 300 | 28.62 | 5.8 | 20.27 | 76% |
| 500 | 27.97 | 1.54 | 5.51 | 94% |
| 700 | 28.12 | 1.05 | 3.73 | 96% |
| 900 | 27.81 | 0.83 | 2.98 | 96% |
| Reagent #4 | | | | |
| 0 | 29.48 | 21 | 71.23 | |
| 100 | 29.29 | 17.2 | 58.72 | 18% |
| 150 | 29.52 | 16.5 | 55.89 | 22% |
| 200 | 29.87 | 11.7 | 39.17 | 45% |
| 250 | 29.19 | 6.1 | 20.90 | 71% |
| 300 | 29.15 | 4.9 | 16.81 | 76% |
| 500 | 28.76 | 1.5 | 5.22 | 93% |
| 700 | 29.1 | 0.6 | 2.06 | 97% |
| 900 | 28.55 | 0.3 | 1.05 | 99% |
| Reagent #3 | | | | |
| 0 | 29.48 | 21 | 71.23 | |
| 100 | 29.18 | 20.5 | 70.25 | 1% |
| 150 | 29.49 | 18.7 | 63.41 | 11% |
| 200 | 29.4 | 11.4 | 38.78 | 46% |
| 250 | 29.13 | 8.4 | 28.84 | 60% |
| 300 | 29.39 | 4 | 13.61 | 81% |
| 500 | 29.01 | 1.2 | 4.14 | 94% |
| 700 | 28.95 | 1.4 | 4.84 | 93% |
| 900 | 29.4 | 1.4 | 4.76 | 93% |

Example 4

Profile Study with Reagent #4

A profile test similar to Example 3 (using about 5% (w/w) calcium sulfate) was conducted by employing Reagent #4 as the complex reagent. The test results are summarized in the following Table 4. When 200 ppm the complex reagent was used to treat the acid solution, the Cd removal rate was about 70% (calculated by (60.5−18.7)/60.5) and the Cd content was reduced to under 20 mg Cd/kg $P_2O_5$. The Cd removal rate was further increased when more complex reagents were employed (about 80% for 250 ppm; about 90% for 300 ppm; about 96% for 500 ppm).

TABLE 4

Cd removal with Reagent #4

| Dosage (ppm) | $P_2O_5$% (w/w) | Cd (ppm) | mg Cd/kg $P_2O_5$ | Cd removal rate % |
|---|---|---|---|---|
| 0 | 29.11 | 17.6 | 60.5 | |
| 150 | 27.54 | 9.12 | 33.1 | 45% |
| 200 | 28.97 | 5.41 | 18.7 | 69% |
| 250 | 29.15 | 3.36 | 11.5 | 81% |
| 300 | 28.75 | 1.83 | 6.4 | 89% |
| 500 | 28.38 | 0.66 | 2.3 | 96% |
| 700 | 29.79 | 0.43 | 1.5 | 98% |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

U.S. Provisional Application 62/889,971, filed Aug. 21, 2019 is incorporated herein by reference, in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for manufacturing phosphoric acid from a calcium- and cadmium-containing phosphate ore, comprising the steps of:
   (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 20 to about 40% (w/w);
   (b) removing the calcium sulfate from the aqueous mixture to give a wet-process phosphoric acid solution containing from about 20 to about 45% (w/w) $P_2O_5$ and having a pre-treated cadmium content more than about 10 mg Cd/kg $P_2O_5$;
   (c) treating the wet-process phosphoric acid solution with from about 0.5 to about 10% (w/w) of a solid adsorbing material and from about 150 to about 900 ppm (by weight on a 100% basis with respect to the volume of the wet-process phosphoric acid solution) of a complex reagent to form a cadmium complex-contaminated solid adsorbing material; and
   (d) removing the cadmium complex-contaminated solid adsorbing material from the phosphoric acid solution to yield a treated phosphoric acid solution having a post-treated cadmium content at least about 10% lower than the pre-treated cadmium content; and
   (e) collecting the calcium sulfate removed from the step (b), cleaning the collected calcium sulfate, and adding the cleaned calcium sulfate into the wet-process phosphoric acid solution of step (c) as the solid adsorbing material.

2. The method of claim 1, wherein in the step (c) all of the steps are performed at about 20-50° C.

3. The method of claim 1, wherein in the step (c) all of the steps are performed at about 20-30° C.

4. The method of claim 1, wherein the solid adsorbing material is calcium sulfate, aluminosilicates, activated carbon, plastic resins, diatomaceous earth, perlite, or any combination thereof.

5. The method of claim 1, further comprising a step (f) of collecting the cadmium complex-contaminated solid adsorbing material removed from the step (d), cleaning the collected contaminated calcium sulfate, and adding the cleaned calcium sulfate into the wet-process phosphoric acid solution of step (c) as the solid adsorbing material.

6. The method of claim 1, wherein the step (b) is conducted by reducing the calcium sulfate from the aqueous mixture to give the wet-process phosphoric acid solution containing from about 0.5 to about 10% (w/w) of the calcium sulfate, further wherein the remaining calcium sulfate is used as the solid adsorbing material of the step (c).

7. The method of claim 1, wherein in the step (c) the wet-process phosphoric acid solution is treated with from about 0.5 to about 5% (w/w), from about 0.5 to about 2.5% (w/w), from about 0.5 to about 1% (w/w), or from about 0.5 to about 0.75% (w/w), of the solid adsorbing material.

8. The method of claim 1, wherein the complex reagent has the following structure of formula (I):

$$\begin{array}{c} R_1\text{—}Q\text{—}\underset{\underset{Q\text{—}R_2}{|}}{\overset{\overset{S}{\|}}{P}}\text{—}S^-\ X^+ \end{array} \quad (I)$$

wherein
Q is a bond or O;
$R_1$ and $R_2$ are independently H, or a linear or branched $C_{1-4}$alkyl, wherein at least one of $R_1$ and $R_2$ is not H; and
X is H, an alkali metal or ammonium.

9. The method of claim 1, wherein the complex reagent has the following structure of formula (II):

$$R_1\text{—}Q\text{—}\overset{\overset{S}{\|}}{C}\text{—}S^-\ X^+ \quad (II)$$

wherein
Q is a bond or O;
$R_1$ is a linear or branched $C_{1-4}$ alkyl; and
X is H, an alkali metal or ammonium.

10. The method of claim 1, wherein in the step (c) the wet-process phosphoric acid solution is treated with from about 150 to about 750 ppm, from about 150 to about 500 ppm, or from about 150 to about 250 ppm, from about 175 to about 300 ppm, from about 200 to about 300 ppm, from about 250 to about 500 ppm, or from about 300 to about 500 ppm, of the complex reagent.

11. The method of claim 1, wherein in the step (c) the wet-process phosphoric acid solution is treated with from about 0.5% to about 5% (w/w) of the solid adsorbing material and from about 150 to about 500 ppm (by weight on a 100% basis with respect to the volume of the wet-process phosphoric acid solution) of the complex reagent.

12. The method of claim 1, wherein in the step (c) the wet-process phosphoric acid solution is treated with from about 0.5 to about 1% (w/w) of the solid adsorbing material and from about 150 to about 500 ppm (by weight on a 100% basis with respect to the volume of the wet-process phosphoric acid solution) of the complex reagent.

13. The method of claim 1, wherein in the step (c) the wet-process phosphoric acid solution is treated with from about 0.5 to about 0.75% (w/w) of the solid adsorbing material and from about 150 to about 500 ppm (by weight on a 100% basis with respect to the volume of the wet-process phosphoric acid solution) of the complex reagent.

14. The method of claim 1, wherein in the step (a) the content of calcium sulfate in the aqueous mixture is about 30 to about 35% (w/w).

15. The method of claim 1, wherein in the step (b) the wet-process phosphoric acid solution contains from about 22% to about 32% (w/w) $P_2O_5$, from about 26 to about 30% (w/w) $P_2O_5$, about 28% (w/w) $P_2O_5$, or about 40% (w/w) $P_2O_5$.

16. The method of claim 1, wherein in the step (b) the wet-process phosphoric acid solution contains more than about 40 mg Cd/kg $P_2O_5$, about 60 mg Cd/kg $P_2O_5$, about 80 mg Cd/kg $P_2O_5$, about 100 mg Cd/kg $P_2O_5$, or about 200 mg Cd/kg $P_2O_5$.

17. The method of claim 1, wherein the post-treated cadmium content is at least about 20%, about 40%, about 60%, about 80%, about 90%, or about 95%, lower than the pre-treated cadmium content.

18. The method of claim 1, wherein the calcium- and cadmium-containing phosphate ore further comprises one or more heavy metals other than cadmium, and the method further comprises forming a complex-contaminated solid adsorbing material containing the one or more heavy metals in the step (c), and removing the complex-contaminated solid adsorbing material from the phosphoric acid solution to yield the treated phosphoric acid solution in the step (d).

19. The method of claim 1, wherein in the step (c) the wet-process phosphoric acid solution is treated with from about 300 to about 500 ppm (by weight on a 100% basis with respect to the volume of the wet-process phosphoric acid solution) of the complex reagent, further wherein the complex reagent is an ammonium, sodium, or potassium salt of di-isobutyl dithiophosphinate.

\* \* \* \* \*